United States Patent [19]
May et al.

[11] Patent Number: 5,833,433
[45] Date of Patent: Nov. 10, 1998

[54] ROTATING MACHINERY NOISE CONTROL DEVICE

[75] Inventors: Daryl N. May, Cypress; Robert L. Chapkis, Rancho Palos Verdes, both of Calif.

[73] Assignee: McDonnell Douglas Corporation, Huntington Beach, Calif.

[21] Appl. No.: 779,845

[22] Filed: Jan. 7, 1997

[51] Int. Cl.⁶ .................................................. F04D 29/38
[52] U.S. Cl. ............................................................ 415/115
[58] Field of Search .................................... 415/115, 119, 415/914

[56] References Cited

U.S. PATENT DOCUMENTS

| | | | |
|---|---|---|---|
| 4,175,640 | 11/1979 | Birch et al. .............................. | 181/213 |
| 4,199,295 | 4/1980 | Raffy et al. .............................. | 415/115 |
| 4,255,083 | 3/1981 | Andre et al. ............................. | 415/119 |
| 4,419,045 | 12/1983 | Andre et al. ............................. | 415/119 |
| 4,433,751 | 2/1984 | Bonneau .................................. | 181/213 |
| 4,537,277 | 8/1985 | Bryce ....................................... | 181/214 |
| 5,060,471 | 10/1991 | Torkelson ................................ | 415/119 |
| 5,082,421 | 1/1992 | Acton et al. ............................. | 415/119 |
| 5,092,425 | 3/1992 | Shaw, Jr. ................................. | 181/213 |
| 5,169,288 | 12/1992 | Gliebe et al. ............................ | 415/119 |
| 5,275,528 | 1/1994 | Freeman et al. ........................ | 415/119 |
| 5,340,271 | 8/1994 | Freeman et al. ........................... | 415/1 |
| 5,423,658 | 6/1995 | Pla et al. ................................. | 415/118 |
| 5,458,457 | 10/1995 | Goto et al. ............................... | 415/914 |

*Primary Examiner*—John T. Kwon
*Attorney, Agent, or Firm*—Harness Dickey & Pierce P.L.C.

[57] ABSTRACT

The present invention provides an apparatus and method for reducing noise caused by a rotating component. According to the invention, the apparatus comprises a plurality of emitters adapted to emit fluid under variable pressure in the vicinity of the rotating components such that unsteady forces on the rotating component are reduced or eliminated. Preferably, the apparatus includes at least one duct extending between the emitters and a high pressure area for directing the fluid under pressure. At least one flow controller is disposed along the duct to vary the pressure of the injected flow emitted from the emitters.

19 Claims, 4 Drawing Sheets

ROTATING MACHINERY NOISE CONTROL DEVICE

BACKGROUND OF THE INVENTION

1. Technical Field

This invention generally relates to reducing noise and more particularly, to reducing unsteady force components on rotating machinery, such as aircraft engine blades including fans, rotors, and propellers, using injected flow under pressure.

2. Discussion

As is generally known in the art of acoustics, attenuating noise from rotating machinery, such as aircraft engine blades including fans, rotors, and propellers, is difficult to achieve because the noise sources and propulsive forces are co-located. Therefore, it is not easy to reduce noise without also reducing propulsive forces. Moreover, noise propagation from aircraft engines from source to receiver, such as a person on the ground or in the airplane, is not easily interrupted by walls, enclosures, or other forms of barrier.

In the case of aircraft engine blades, conventional methods of reducing noise include designing for appropriate blade count, aerodynamic loadings and speeds, maintaining adequate distances between blades and other components, and, if possible, using sound absorption treatments on the surfaces of ducts through which air enters and exits the various blades. These noise control features frequently penalize rotating machinery design from other standpoints, such as by raising weight and aerodynamic drag, and introducing complexity.

One system for reducing noise at or near the source is "active noise control". One form of this control is to introduce noise signals, the "canceling signals", with a phase opposite to those from the source, "source signals", at relevant receiver locations. However, there are difficulties in doing this, including the challenge of achieving a strong noise canceling signal, the difficulty of locating the source of the signal in such a way that the reversal of phase is achieved at an appropriately extensive number of receiver points, and the need to achieve a reliable noise cancelling signal system so that the conventional noise control devices can be reduced or eliminated.

One active noise control system is disclosed in a copending application entitled "Rotating Machinery Active Noise Control" and assigned to the Assignee of the present invention, which is hereby expressly incorporated by reference herein. This system directs fluid under pressure to emission points rotating in phase with the rotating component source signals. In this way, an inverted pressure wave is created to cancel the source signals.

While this system is generally effective for reducing noise, there is room for improvement in the art. For instance, it is known that unsteady forces form on rotating blades when they are subjected to the influence of stators, guide vanes, or periodic disturbances in the flow entering or exiting the blade row. These unsteady forces contribute to the noise generated by the rotating machinery.

It would be desirable to reduce or eliminate these unsteady forces such that the forces on each blade are approximately the same for an entire revolution of the blade. By eliminating or reducing the unsteady forces, the noise generated by the rotating machinery may be reduced. Also, the rotating machinery may be designed lighter by virtue of having more closely spaced rotors and stators. The air inlets may also be designed with less emphasis on distortion removal, e.g., the inlets may be shaped other than circular in cross-section and other than with axes aligned with the engine shaft. Furthermore, the machinery should operate more efficiently by the reduction or elimination of unsteady forces since they represent an off design or non-optimum force distribution on the blade. Additionally, reducing unsteady forces would result in improved fatigue life for the blades, which would experience fewer stress and strain reversals.

SUMMARY OF THE INVENTION

The above and other objects are provided by a flow control apparatus and method comprising a plurality of emitters proximate to a rotating component generating source signals and air flow controllers. The emitters and controllers operably cooperate to emit fluid under variable pressure such that unsteady forces on rotating blades are reduced or eliminated. Preferably, the apparatus includes at least one duct operably coupled to the emitters for directing the fluid under pressure from a high pressure area to the emitters. According to the invention, a predetermined number of flow controllers are disposed along the duct to vary the pressure of the injected flow emitted from the emitters.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The system described herein is advantageous over other known devices for reducing or eliminating unsteady forces on rotating blades to reduce the noise from rotating machinery. For instance, a time varying pressure pulse is emitted in the vicinity of each blade, such that the forces on individual blades are approximately the same for an entire revolution about the engine shaft axes. The present system does not depend on a canceling signal having the same wave form displaced in time as the source signal to "cancel" that signal. According to the invention, the wave form of the emitted fluid under pressure is shaped with time to cause the unsteady forces on the blade to be reduced or eliminated. The present invention produces a noise reduction by reducing or eliminating the unsteady force components on the rotating blades.

The present invention uses fluid under pressure, which is emitted from locations which, in some embodiments, rotate in phase with and therefore at the same rotational speed as the rotating machinery noise sources. In other embodiments, the fluid under pressure is emitted from fixed locations. Generally, fluid is bled from a high pressure area within an engine and is conducted to various emission points in the vicinity of the rotating blades. The fluid emission under variable pressure is caused to occur at locations which reduce or eliminate the unsteady forces on the blade.

It should be noted that such fluid emissions created by the fluid under pressure comprise the same fluid type as that which passes through the turbomachinery. Therefore, these emissions of fluid under pressure are preferably gaseous, in the case of gas turbine machinery—"turbomachinery", and are preferably liquidic, in the case of liquid turbomachinery. In either case, the fluid is transported from a high fluid pressure location through ducts, pipes, and the like before being emitted. In this description, emphasis is given to aircraft jet engine noise reduction, however, one skilled in the art will readily recognize that the present invention extends to other forms of rotating machinery.

Figures 1, 2:
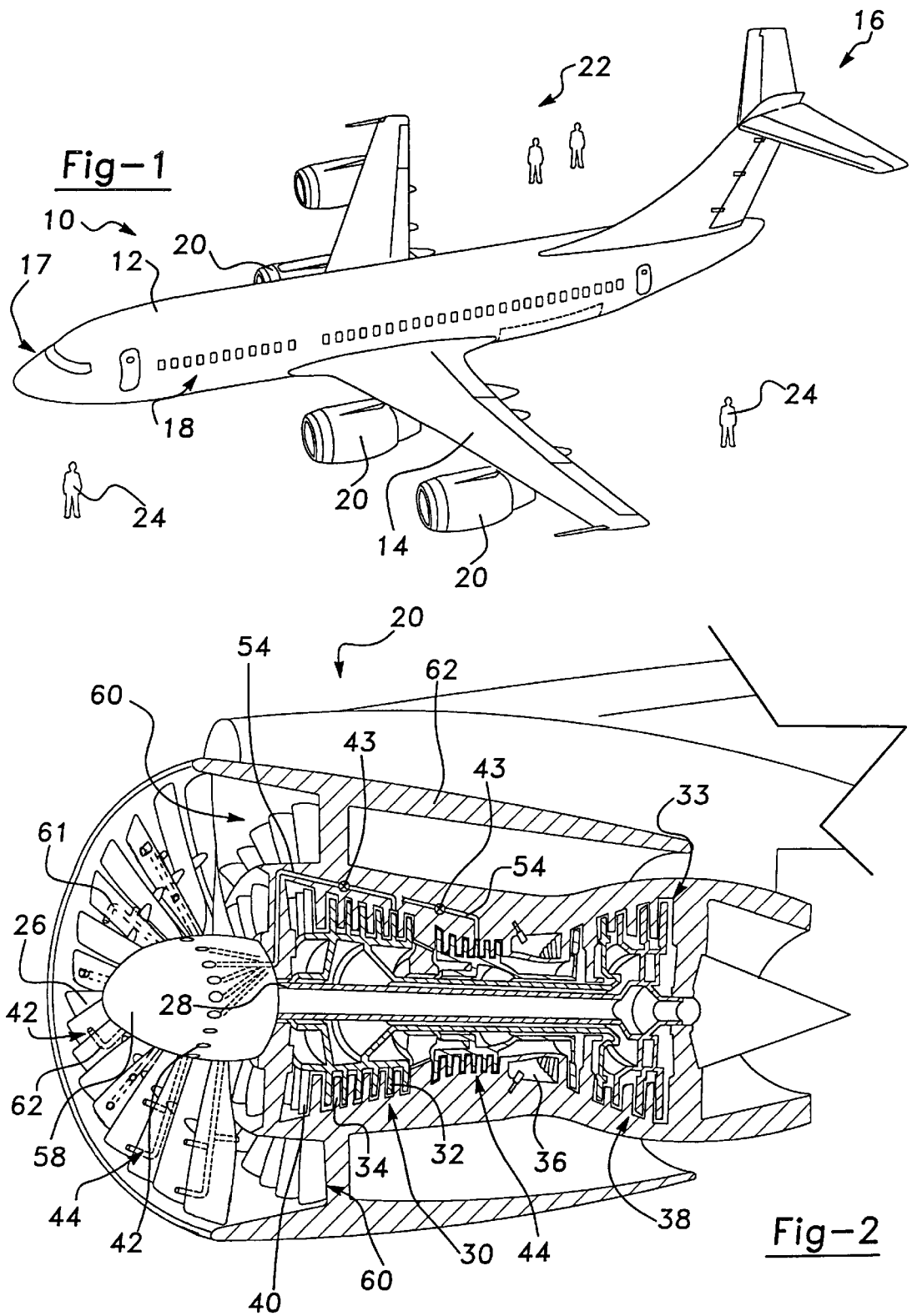
FIG. 1 is a perspective view of an aircraft having rotary type turbine engines suspended from the wings thereof.
FIG. 2 is a partially cut-away perspective view of a rotary type turbine engine having a flow control noise reduction system incorporated therein according to the present invention.

Referring now to the drawings, FIG. 1 shows an airplane 10 incorporating a flow control system according to the present invention. As is generally known, the aircraft includes a body 12, wings 14 and horizontal and vertical stabilizers 16. Also, a cockpit 17 and passenger compartment 18 are formed in the body 12. A plurality of aircraft jet engines 20 are suspended below the wings 14. For the purposes of this disclosure the engine 20 is defined to also include the nacelles.

The plurality of aircraft jet engines 20 are a source of substantial noise when operated. The noise can be so loud that it affects or annoys the passengers within the passenger compartment 18, the flight crew within the cockpit 17, the ground crew 22 on the ground in the vicinity of the aircraft 10, and other observers 24 in reasonable proximity to the aircraft 10, including those on the ground when the aircraft is in flight. The present invention, which is preferably implemented within the engines 20, serves to reduce the noise from the rotating machinery within the engines 20.

Turning now to FIG. 2, an aircraft jet engine 20 is shown in greater detail. Although the type of engine 20 shown is a turbo fan, the present invention may be implemented in other engine types with similar results. At the front of the engine 20, a fan 26 is rotatably mounted on a shaft 28 and operates to draw air into the engine 20. A compressor 30 is disposed along the shaft 28 rearward of the fan 26.

The compressor 30 contains multiple sets of rotating blades 32 interspersed with stationary stators (also called "guide vanes") 34 which, in combination, act on a portion of the air from the fan 26 which enters therein. The compressor 30 operates to raise the pressure of the air, which then flows to the combustors or combustion chambers 36 disposed rearward of the compressor 30. The air passes through turbines 38 which operate to drive the compressor 30 and the fan 26. A jet engine fan duct is shown at 60 and is defined herein as the duct bounded by the approximately cylindrical structure 62 which immediately surrounds the engine fan blades 26 and forms the boundary through which the fan air passes.

The interaction of rotating blades, such as the fan blades 26, compressor blades 32 or turbine blades 33, with stationary stators, guide vanes, or periodic disturbances in the flow entering or exiting the blade row such as caused by air inlet geometry or flow not aligned with the axis of the rotating shaft 28, causes unsteady forces on the rotating blades. In order to counteract these unsteady forces, bleed air is drawn from the engine 20 and is directed through ducts to a plurality of fluid emission points or emitters 42. The strength or volume of the air pulses emitted from the emitters 42 is controlled by at least one flow controller 43.

The position of the air emission points or emitters 42 may be fixed for practical reasons, or rotating emitters may be employed where it is desirable to change the position of the air emission point. Also, it should be noted that the emitters 42 may require application based shaping to create a pressure variation with a circumferential position that is of the appropriate form.

For rotating emitters, the emission points 42 can be constructed in a number of different ways. For instance, the bleed air may be directed through a duct 54 formed within the aircraft engine 20 or any hub or spinner 58. The plurality of emitters 42 are then formed circumferentially about the shaft 28, or hub 58 and communicate with the duct 54. Bleed air from the engine 20 may also be directed through ducts 61 disposed within the individual blades 44 of the fan 26, compressor 30, or turbine 38. The bleed air is then emitted through emitters 42 located on the blades 44 or on extensions 62 of the blades 44.

Figure 3:
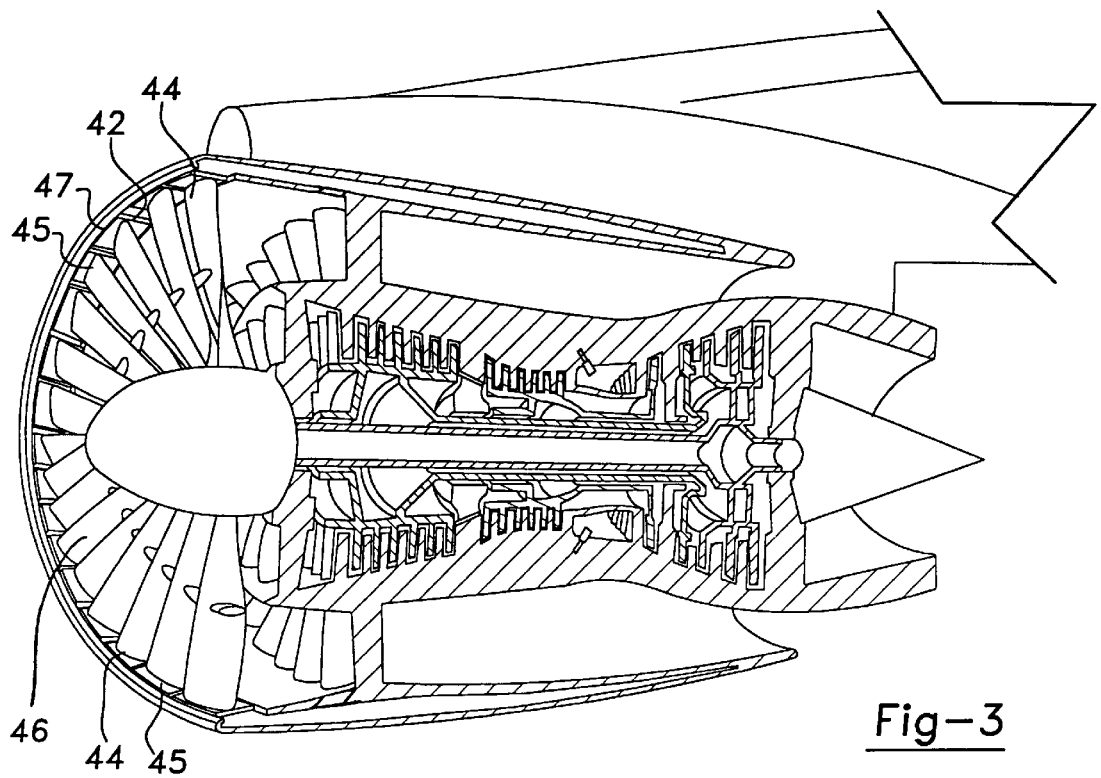
FIG. 3 is a partially cut-away perspective view of a rotary type turbine engine depicting alternative emitter and duct configurations.
Figure 3A:
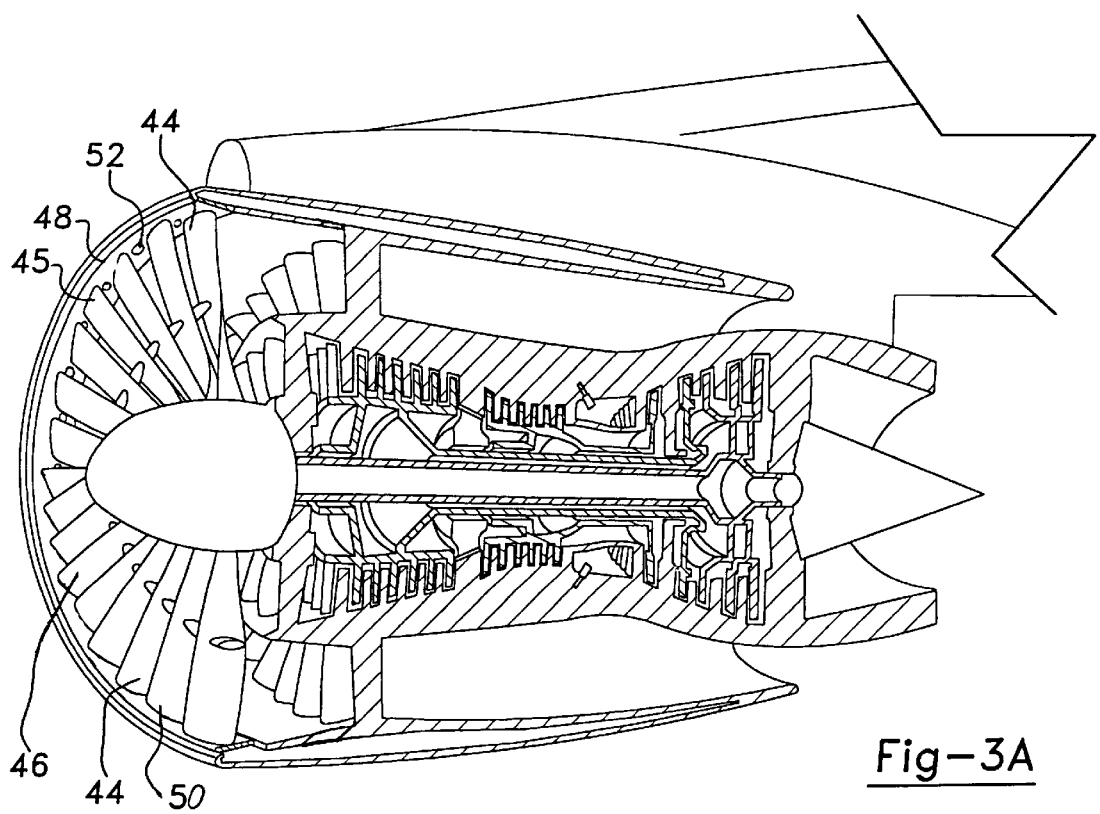
FIG. 3A is a partially cut-away perspective view of a rotary type turbine engine depicting alternative emitter and duct configurations.

Additional rotating emission point configurations are shown in FIGS. 3 and 3A. As shown in FIG. 3, the emission points 42 may be included as part of a blade 44 or a blade row 46. In this case, the existing blade tips 45 may be fit with extensions 47 disposed in a circumferential direction and/or in a fore-and-aft direction. Alternatively, as shown in FIG. 3A, each of the blades 44 in a blade row 46 may be either mechanically attached to or push-against-to-rotate a common, ringshaped end-plate 48. The end-plate 48 is disposed circumferentially about the blade tips 50 and includes holes/openings 52 formed therethrough which function as the rotating air emission points 42. The end-plate 48 may also be held to the blades 44 by electromagnetic or other means rather than mechanically. For a more detailed description of the various rotating emitter locations, reference should be made to the aforementioned co-pending application entitled "Rotating Machine Active Noise Control". FIG. 3A also illustrates a configuration with fixed emission points. For a fixed-emission-point configuration, the ring-shaped end plate 48 and the emission points 52 are fixed and do not rotate with the blades.

Figure 4:
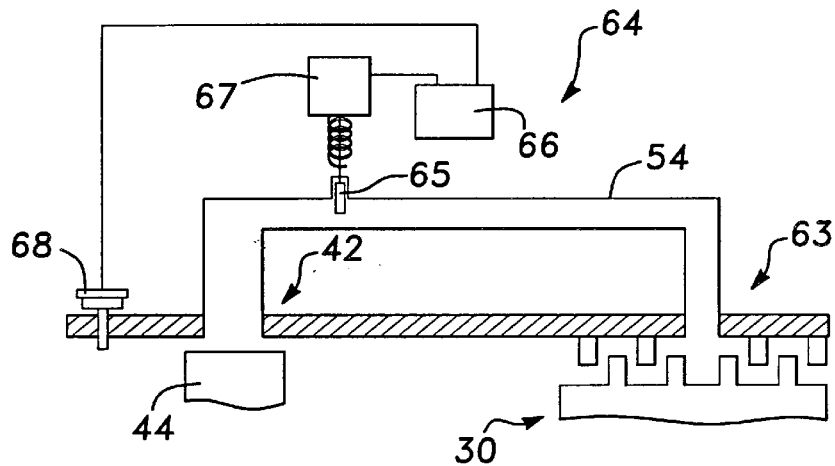
FIG. 4 is a schematic view of a flow controller according to a first embodiment of the present invention.

Referring now to FIG. 4, a more detailed view of the duct 54 is shown. The duct 54 extends between a high pressure area 63 within the engine 20, such as the compressor 30, and an emitter 42. A flow controller 64 for varying the pressure injected by the emitter 42 is interposed along the duct 54. In the embodiment shown in FIG. 4, the flow controller 64 comprises a solenoid powered sliding shutter. Preferably the displacement of the shutter 65 is proportional to the strength of an electrical signal applied to the solenoid 67. This signal varies with time according to the position of the blades 44 as dictated by a controller 66. The controller 66 may be synchronized with the position of the blades 44 or may generate a signal shaped by pressure sensors 68 located near the blades 44. Depending on its displacement, the shutter 65 may block off all, none, or a portion of the fluid flow through the duct 54.

Figure 5:
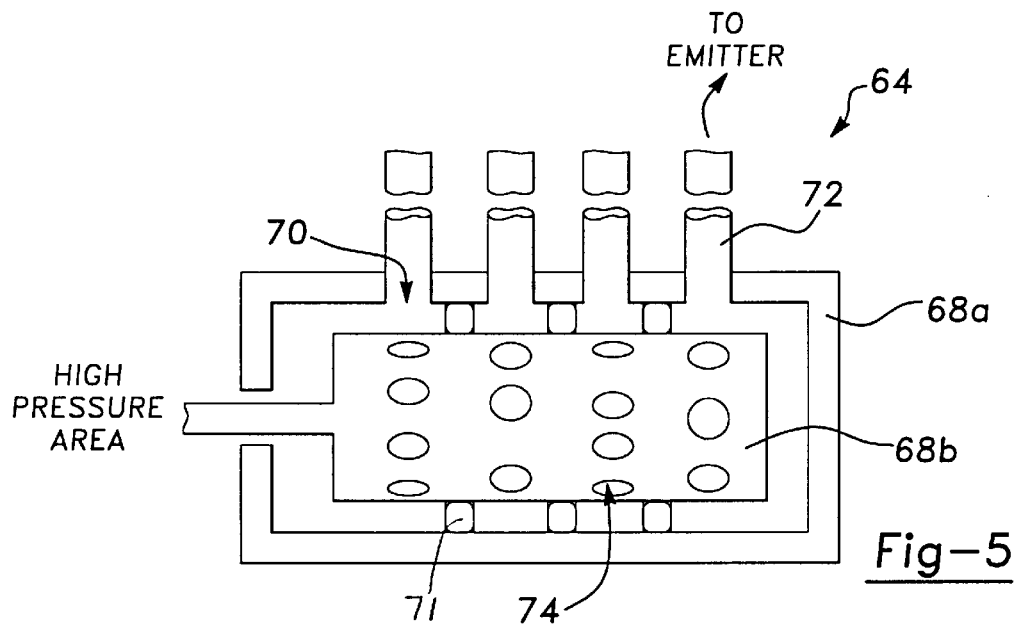
FIG. 5 is a schematic view of a flow controller according to a second embodiment of the present invention.

Turning to FIG. 5, an alternate embodiment of the flow controller 64 is shown. This embodiment utilizes two concentric cylinders 68a and 68b. The cylinder 68a includes multiple outlet ports 70 which communicate with outlet ducts 72 extending to the various emitters 42. The cylinder 68b includes a plurality of holes 74 arranged around its circumference such that the cylinder 68b is perforated. The cylinder 68b rotates within the stationary cylinder 68a along selas 71 in a synchronized fashion according to the position of the engine shaft 28. As the holes 74 in the cylinder 68b align with the ports 70 of the cylinder 68a, pressurized air ducted from the high pressure area 64 passes therethrough and is delivered by the ducts 72 to the emitters 42.

It should be appreciated that when the holes 74 and the ports 70 align perfectly, the flow rate of pressurized air therethrough is at a maximum. When the holes 74 are totally misaligned with the ports 70, the flow rate of the pressurized air therethrough is zero. Accordingly, the flow rate of the pressurized air varies in proportion to the degree of alignment of the holes 74 and the ports 70. Preferably, the holes 74 are sized and located so as to produce the desired shape and repetition rate of injected flow. If configured appropriately, there may be as few as one concentric cylinder-type flow controller 64 per engine.

Figure 6:
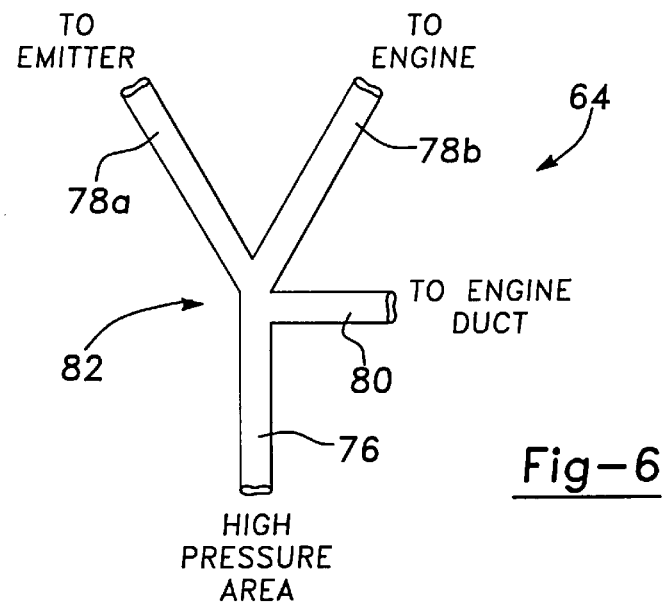
FIG. 6 is a schematic view of a flow controller according to a third embodiment of the present invention.

Referring to FIG. 6, a third embodiment of the flow controller 64 is shown and generally comprises a fluidic valve. Preferably, one fluidic valve is provided for each emitter 42. The fluidic valve includes a single inlet tube 76 and two outlet tubes 78a and 78b arranged in an approximate "Y" configuration. In addition, at least one side branch tube 80 communicates with the inlet tube 76 upstream of the junction 82.

The inlet tube 76 communicates with a high pressure area 64 of the engine 20 to conduct engine bleed air. One of the outlet tubes, 78a for example communicates with an emitter 42 to provide the pressurized fluid. The other outlet tube 78b is routed back to the engine 20 for waste air disposal and thrust recovery.

Control air is injected through the side branch tube 80 to cause the flow through the inlet tube 76 to deflect toward one or the other outlet tubes 78a or 78b. Thus, the flow rate through the outlet tubes 78a and 78b is controlled to generate an outlet flow form of the desired shape. To accomplish this, the side branch tube 80 communicates with the engine duct 60 where air flow variation can be detected. Even more preferably, the side branch tube 80 communicates with the engine duct 60 in the vicinity of the blades 44 which are to be quieted, because the pressure signal therefrom occurs at the same repetition rate as is required in the emitter signal through the outlet tube 78a. The advantage of a fluidic valve is its lack of moving parts and that a small amount of control fluid controls a large amount of primary flow.

Figure 7:
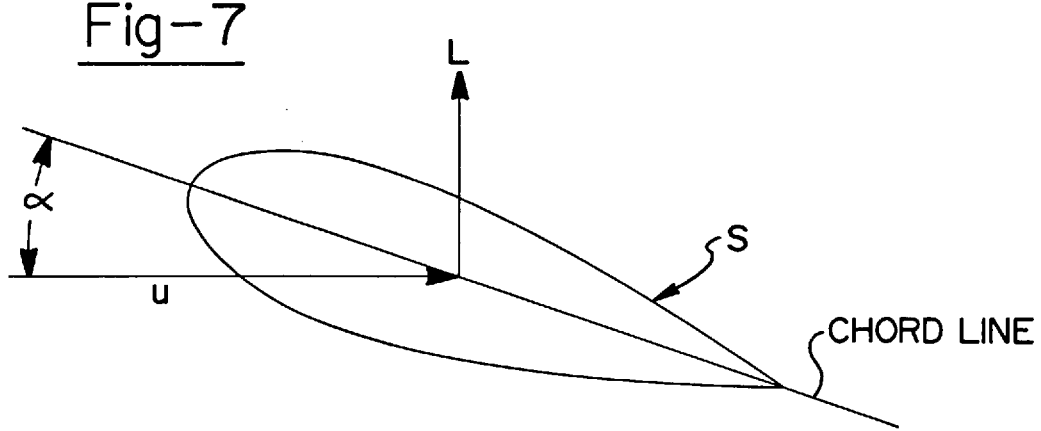
FIG. 7 is a cross-sectional view of a blade showing the lift force on the blade and the flow velocity relative to the blade chord.
Figure 8:
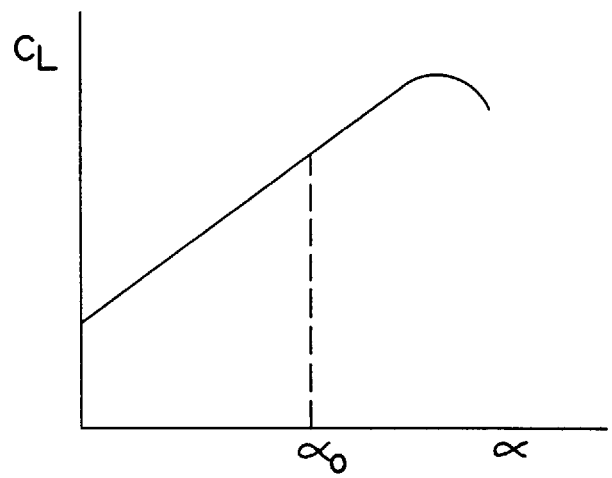
FIG. 8 graphically illustrates how a lift coefficient varies with angle of attack.
Figure 9:
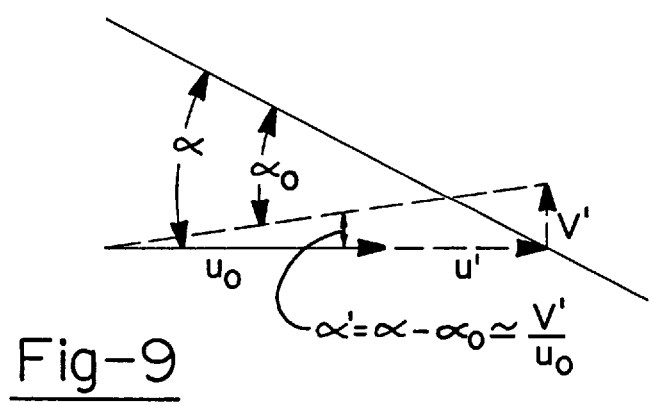
FIG. 9 diagrammatically shows the mean and fluctuating parts of velocity and angle of attack.

Referring now to FIGS. 7–9, the mechanics of how fluid injection controls the fluctuating forces on a blade is illustrated. In FIG. 7, L represents the lift force on a blade, S represents the surface area of the blade, U represents the flow velocity relative to the blade chord and α represents the blade angle of attack. The lift on the blade can be written in terms of the blade lift coefficient $C_L$ as follows:

$$L = \tfrac{1}{2} \rho U^2 S C_L(\alpha) \tag{1}$$

FIG. 8 shows schematically how the lift coefficient varies with angle of attack. Since the lift depends on both the flow velocity and the angle of attack, changes in either will cause a corresponding change in lift. Flow non-uniformities or a time-phased injection of flow will cause U and α to vary with time as a blade row rotates.

FIG. 9 is a schematic diagram showing the mean and fluctuating parts of the velocities and the angle of attack. The lift L will fluctuate with time in response to those variations. To quantify how the lift fluctuations depend on velocity fluctuations, first decompose L, U, and α into a mean (steady) part and a perturbation about the mean. That is, $$\begin{aligned} L &= L_0 + L' \\ U &= U_0 + U' \\ \alpha &= \alpha_0 + \alpha' \end{aligned} \tag{2}$$

Now consider the usual case where the velocity fluctuations are small compared to the mean velocity. Substituting Equations 2 into Equation 1 and collecting terms of the same order then gives the following two equations:

$$L_0 \tfrac{1}{2} \rho U^2 S C_L \tag{3}$$

$$L' = \rho U^2 S [u'/U_0 C_L(\alpha_0) + 1\text{\slash}84 \ 'dC_L(\alpha_0) 2 U_0 d\alpha] \tag{4}$$

Equation 3 shows how the mean lift depends on the mean velocity $U_0$ and the mean angle of attack $\alpha_0$. Equation 4 shows how L', the fluctuating part of the lift, depends on u' the component of fluctuating velocity parallel to the chord, and on v' the component of the fluctuating velocity normal to the chord. In the present invention, the flow rate of injected fluid in a direction parallel to the chord determines u' and the flow rate of injected fluid in a direction perpendicular to the chord determines v'. Since the derivative $dC_L/d\alpha$ is ordinarily much larger than $C_L$ itself, Equation 4 indicates that the lift-fluctuations can be controlled more effectively by injecting fluid in the direction normal to the chord than in the direction parallel to the chord.

Thus, according to the invention, the pressure of emitted pulses is varied with time to reduce the part of the source signal caused by unsteady pressure forces on the fan blades, upstream and downstream stators (guide vanes) and rotor blades. This differs from prior approaches which target the constant component of the rotating blades' pressure field as experienced at a point fixed within the engine due to the rotation of a steady-with-time pressure field.

In order to vary the pressure of the emitted fluid, a flow controller is disposed along a duct between a high pressure area and a plurality of emitters, which varies the volume of air passing to the emitters as a function of rotating blade position. Although the position of the blades may be sensed and communicated to the controllers, a position schedule or mechanical actuator is preferred. The fluid is emitted from the plurality of openings in the vicinity of each rotating blade at a controlled pressure such that the unsteady forces on the specific blade passing the opening are reduced or eliminated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A flow control apparatus for balancing forces experienced by a rotating element of a rotating machine, the rotating element having a plurality of vanes, said apparatus comprising:

at least one fluid emitter disposed in the vicinity of said rotating element for discharging pressurized fluid on said rotating element;

at least one duct coupling said fluid emitter with a high pressure fluid source for supplying said pressurized fluid; and a flow controller operably coupled to said fluid emitter for controlling a pressure of said pressurized fluid directed against said vanes to neutralize uneven forces experienced by said vanes during operation of said rotating element.

2. The apparatus of claim 1, wherein said controller varies the pressure of said fluid according to a position of said rotating element.

3. The apparatus of claim 1, wherein said flow controller is interposed along said duct.

4. The apparatus of claim 1, wherein said flow controller comprises a shutter valve.

5. The apparatus of claim 1, wherein said flow controller comprises a concentric cylinder valve.

6. The apparatus of claim 1, wherein said flow controller comprises a fluidic valve.

7. An apparatus for reducing or eliminating unsteady forces on a plurality of vanes of a rotating component of a rotating device, said apparatus comprising:

a plurality of fluid emitters disposed proximate said vanes of said rotating component for emitting pressurized fluid against said vanes;

at least one duct extending between said emitters and a source of said pressurized fluid; and a flow controller interposed along said duct for varying a pressure of said pressurized fluid emitted from said emitters so as to enable pressurized fluid emitted from said emitters to neutralize said unsteady forces.

8. The apparatus of claim 7, wherein said flow controller varies said pressure according to a position of said rotating component.

9. The apparatus of claim 7, wherein said flow controller comprises a shutter valve operable to regulate the flow of said pressurized fluid through said duct.

10. The apparatus of claim 9, wherein an amount of displacement of said shutter valve is varied according to a controller signal corresponding to a position of said rotating component.

11. The apparatus of claim 7, wherein said flow controller comprises a concentric cylinder valve including a first perforated cylinder rotatably disposed within a second cylinder having ports therein communicating with said perforations and said fluid emitters.

12. The apparatus of claim 11, wherein said perforated cylinder rotation corresponds to a position of said rotating component.

13. The apparatus of claim 7, wherein said flow controller comprises a fluidic valve including an input communicating with said high pressure area, an outlet communicating with said emitter, and a second outlet communicating with a means for said fluid recovery.

14. The apparatus of claim 13, further comprising a flow control tube communicating with a source of control air and said fluidic valve for directing said fluid pressurized.

15. A method for reducing or eliminating unsteady forces on a plurality of vanes of a rotating element of a rotating machine, said method comprising the steps of:

determining the existence of said unsteady forces on said blades;

conducting a fluid under pressure from a high pressure area of said rotating machine to at least one fluid emitter disposed proximate said rotating vanes; and controlling a pressure of emitted fluid from said emitter according to a position of said rotating vanes to equalize the pressure on said vanes such that the pressure on all of said vanes is approximately equal for an entire revolution of said rotating element.

16. The method of claim 16, wherein said vanes comprise a jet engine blade row and said high pressure area comprises a location in the vicinity of a jet engine stator.

17. The method of claim 15, wherein said controlling step comprises actuating a shutter valve.

18. The method of claim 15, wherein said controlling step comprises actuating a concentric cylinder valve.

19. The method of claim 15, wherein said controlling comprises actuating a fluidic valve.

* * * * *